United States Patent [19]

Kaneko

[11] Patent Number: 5,503,347
[45] Date of Patent: Apr. 2, 1996

[54] DRAG DEVICE FOR A DOUBLE BEARING FISHING REEL

[75] Inventor: Kyoichi Kaneko, Tokyo, Japan

[73] Assignee: Daiwa Seiko, Inc., Tokyo, Japan

[21] Appl. No.: 227,877

[22] Filed: Apr. 15, 1994

[30] Foreign Application Priority Data

Apr. 16, 1993 [JP] Japan ................. 5-112502

[51] Int. Cl.$^6$ ............................. A01K 89/033
[52] U.S. Cl. ................... 242/302; 242/249
[58] Field of Search ................. 242/259, 268, 242/302, 249

[56] References Cited

U.S. PATENT DOCUMENTS 4,634,079  1/1987  Furomoto ................. 242/268
5,090,634  2/1992  Kaneo ..................... 242/268

Primary Examiner—Katherine Matecki
Attorney, Agent, or Firm—Longacre & White

[57] ABSTRACT

To await a hit of a fish with a small tension applied to a fishline, there is provided a secondary drag mechanism in a drag device. A hollow shaft is rotatably fitted on a fixed support shaft of a reel frame and is operatively prevented from rotating in a reverse direction by a rachet and a claw. A braking gear meshed with a linking gear of a handle shaft and rotatably fitted on the hollow shaft is braked by a first drag device having friction plates on the hollow shaft. When the claw is disengaged from the ratchet, the secondary drag mechanism prevents the reverse rotation of the hollow shaft with respect to the fixed support shaft to produce a minute braking force against the reverse rotation of the handle shaft.

5 Claims, 3 Drawing Sheets 5,503,347

DRAG DEVICE FOR A DOUBLE BEARING FISHING REEL

BACKGROUND OF THE INVENTION

The present invention relates to a drag device for use with a double bearing type or both ends support type reel for fishing.

In order to perform with such fishing reel a so-called "fish wait fishing" wherein a biting of fish is awaited while a reduced tension is applied to a fishline, there is commonly known the following fishing methods: One is an angler awaits the biting of-fish while thumbing the spool in a state that a clutch for the spool shaft is disengaged. The other is an angler awaits the biting of fish in a state that a click claw is set into a sound generation state and the clutch is disengaged. The above-thumbing method requires the continuous thumbing operation of the angler, and thus the fishing operation is made troublesome. On the other hand, the latter fishing method employing the click claw requires two switching operations for the clutch and the click claw, and further it is impossible to finely adjust the tension on the fishline as desired in accordance with the kind of fish, the kind of the fishline, and the environmental fishing condition since the braking force is provided by the resistance of the click claw.

SUMMARY OF THE INVENTION

The present invention was made in order to solve the above-noted problems found in the prior art arrangements. Accordingly, a primary objective of the present invention is to provide a drag device for a fishing reel, whereby the fine or minute braking force or tension under the fish wait state can be appropriately adjusted in accordance with the fishing condition or the like.

To attain the above-noted and other objectives, the present invention provides a drag device for a fishing reel having a frame on which a fixed support shaft is projected, which includes: a hollow shaft rotatably fitted on the fixed support shaft and engageable with a reverse rotation preventive means for preventing a reverse rotation of the hollow shaft with respect to the fixed support shaft; a brake gear rotatably fitted on and frictionally coupled to the hollow shaft to constitute a first drag mechanism for producing a first braking force against a reverse rotation of a spool in a first condition wherein the reverse rotation preventive means prevents the reverse rotation of the hollow shaft; and a second drag mechanism for frictionally coupling the hollow shaft to the fixed support shaft to produce a second braking force against the reverse rotation of the spool in a second condition wherein the reverse rotation preventive means permits the reverse rotation of the hollow shaft. Preferably, the first and second drag mechanisms are respectively equipped with adjusting knobs to control the first and second braking forces.

The drag device may further include an automatic returning means for returning the reverse rotation preventive means from the second condition to the first condition upon rotation of a handle. Preferably, either of the first and second braking force is transmitted to the spool through a gear provided on the handle shaft. The gear may be a drive gear securely fixed on the handle shaft or a linking gear associated with a planetary gear train on the handle shaft.

DETAILED DESCRIPTION OF THE PREFERRED EMBODIMENT

Figure 1:
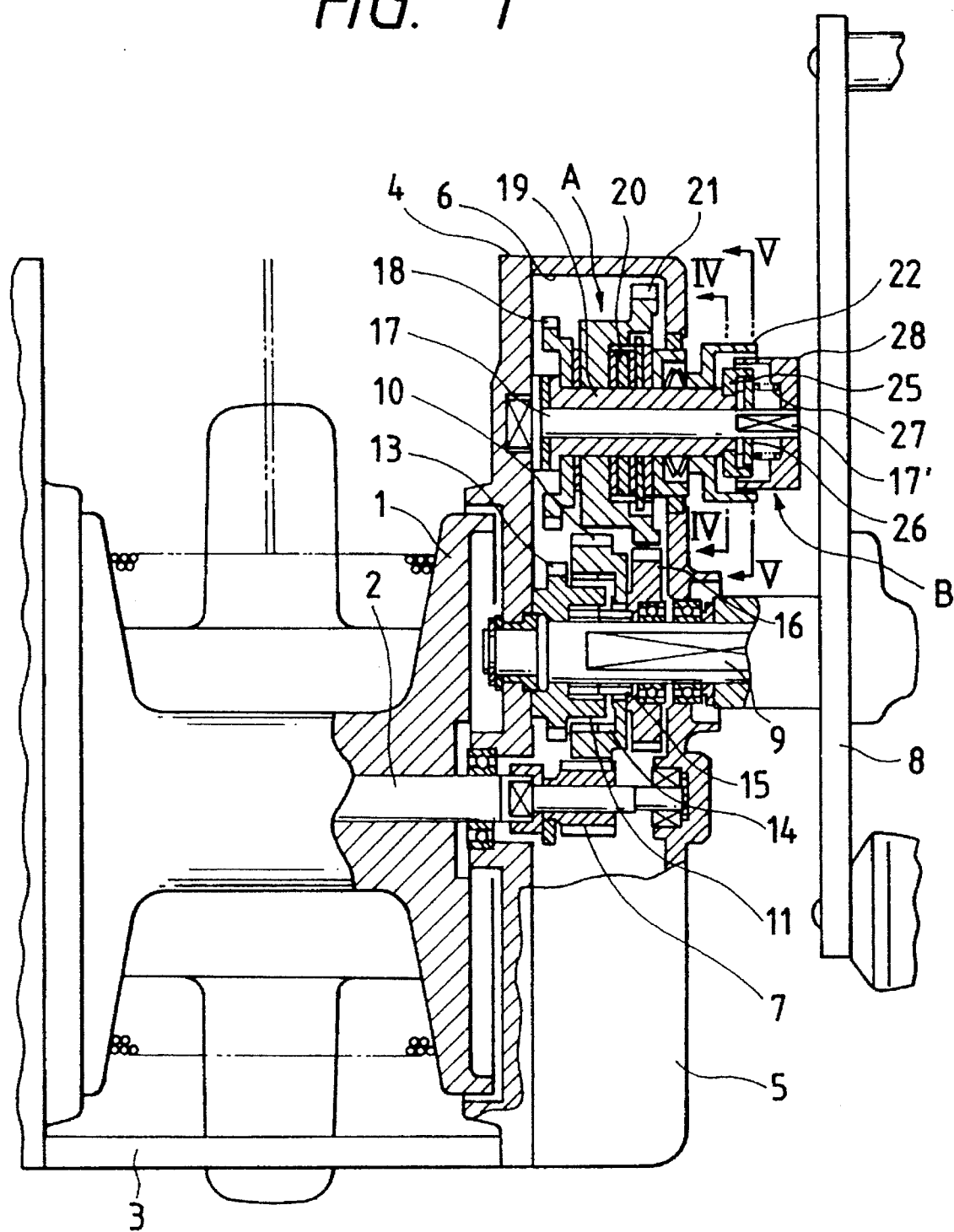
FIG. 1 is a partially cut-away plane view showing a fishing reel according to the present invention.

A preferred embodiment of the present invention will now be described with reference to the accompanying drawings attached hereto. FIGS. 1 to 5 show a fishing reel constructed in accordance with the present invention. A spool shaft 2 having a spool thereon is supported by a reel body 3 in a well known manner. A pinion 7 is provided on a portion of the spool shaft 2 within a gear box 6 formed by a side cover 5 and a frame 4 which constitutes one side of the reel main body 3. The pinion 7 is engaged with and disengaged from the spool shaft 2 through a clutch. The pinon 7 is meshed with a drive gear 10 which is rotatably fitted on a handle shaft 9 having a handle 8, the handle shaft 8 being supported by the reel main body 3.

A ratchet 13 which axially supports planetary gears 11 and with which a reverse rotation preventive claw 12 is engaged is integrally secured to the handle shaft 9. Each of the planetary gears 11 is meshed at an outer side with an internal gear 14, which is formed on an inner circumference of the drive gear 10, and at an inner side with a sun gear 15 which is rotatably fitted on the handle shaft 9. A linking gear 16 is integrally provided on the sun gear 15.

A non-rotatable fixed support shaft 17 is secured on the frame 4 so as to project outward therefrom. To the fixed support shaft 17, rotatably fitted is a hollow shaft 19 integrally provided at its proximal end with a ratchet 18. A braking gear 21 is fitted on the outer periphery of the hollow shaft 19, the braking gear being meshed with the linking gear 16 and braked by friction plates 20. The friction plates 20 are adjustably depressed by a drag knob 22 which is threadingly engaged with the hollow shaft 19. These components constitute a first drag mechanism A. An engagement claw 24 is provided for the ratchet 18 so as to be engaged with and disengaged from the ratchet 18 with the action of the cam 23' of the operation member 23. The engagement claw 24 is biased by a spring 24' in a direction to be engaged with and retained on the ratchet 18.

On the distal end of the hollow shaft 19, there is provided a second drag mechanism B which includes a rotation preventive short cylinder 25 retainingly fitted on the distal end of the hollow shaft 19, a friction plate 26 non-rotatably fitted on an incomplete circular portion 17' of a distal portion of the fixed support shaft 17 and brought into abutment with the short cylinder 25, and a spring 27 for axially depressing the friction plate 26 toward the short cylinder 25. A minute braking force applied to the spool by the second drag mechanism B can be adjusted with a second drag knob 28 which is threadingly engaged with the fixed support shaft 17.

The cam 23' of the operation member 23 is provided with a drive projection 23", and a drive rod 29 is movably provided in such a manner that an abutable portion 29' on the upper end of the drive rod 29 is located in the vicinity of the drive projection 23". The drive rod is biased upward by a spring 29'' and movable upward and downward. When the engagement claw 24 is disengaged from the ratchet 18 by the operation member 23, the rod 29 is depressed downward by the drive projection 23'' through the abutable portion 29' so that a lower end of the rod 29 is lowered and located in a rotation locus of a returning projection 13' provided on the ratchet 13.

Figure 2:
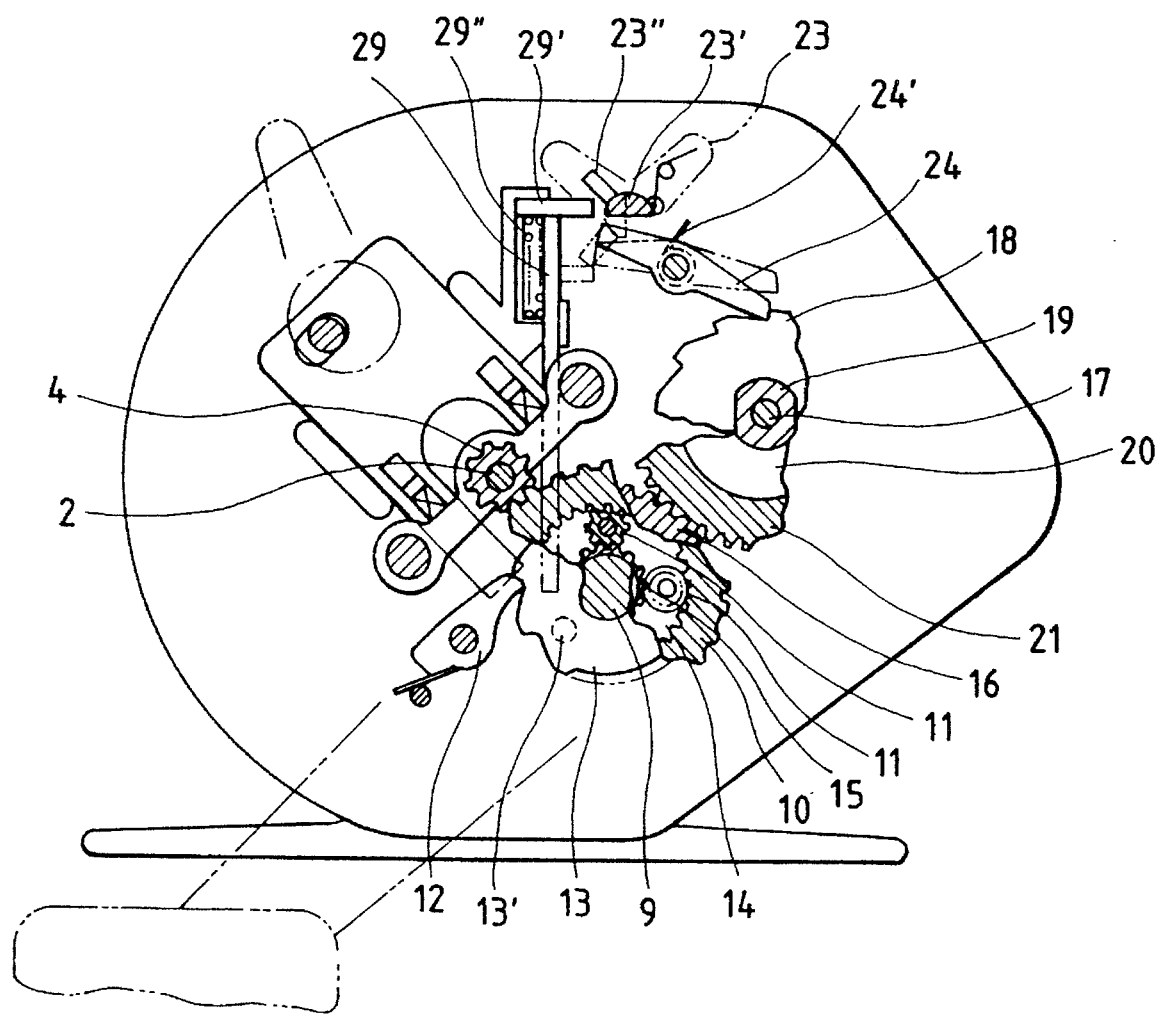
FIG. 2 is a partially cut-away front view showing the fishing reel in a state of the working of a first drag mechanism.

The operation of the fishing reel thus constructed wall be described hereunder. In a state where the engagement claw 24 is kept engaged with the ratchet 18 as shown in FIG. 2, the attempt reverse rotation of the linking gear 16 in conjunction with the reverse rotation of the spool 1 is braked by the braking plates 20 with the aid of the braking gear 21 meshed with the linking gear 16 and the hollow shaft 19 kept in a fixed condition. That is to say, the first drag mechanism A restricts and brakes the attempt reverse rotation of the spool 1 to establish a normal drag condition. In addition, the magnitude of the drag force produced by the first drag mechanism A can be adjusted with the drag knob 22.

Figure 3:
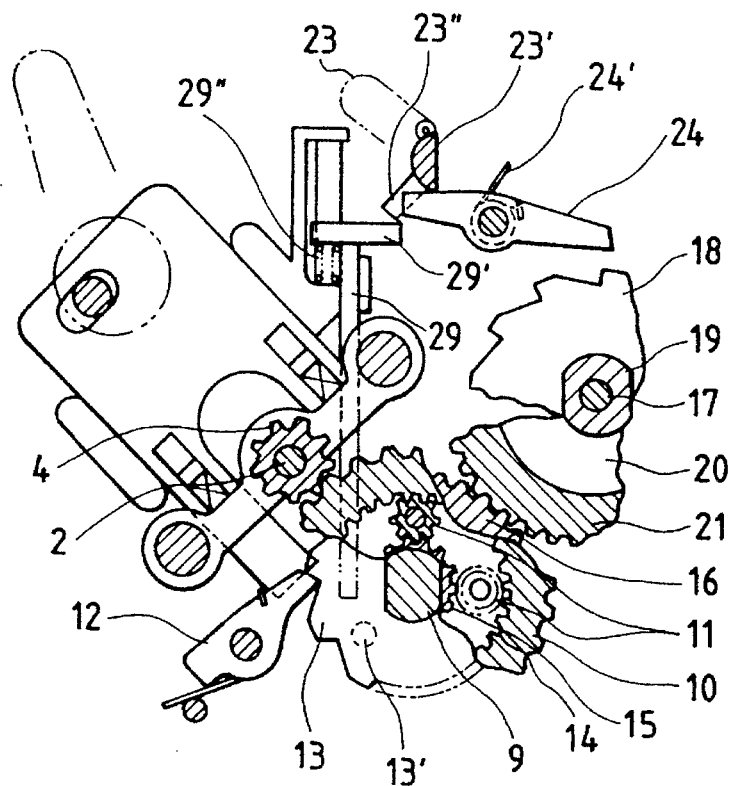
FIG. 3 is a partially cut-away frontal view showing the fish reel in a state of the working of a second drag mechanism.
Figure 4:
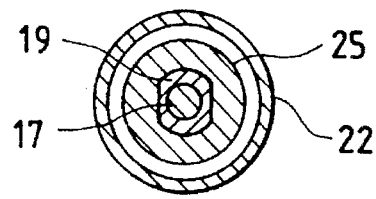
FIG. 4 is a cross-sectional view taken along line 4—4 in FIG. 1.
Figure 5:
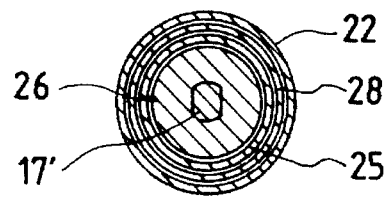
FIG. 5 is a cross-sectional view taken along line 5—5 of FIG. 1.

To establish the fish wait condition, the engagement claw 24 is disengaged from the ratchet 18 through the action the operation member 23 as shown in FIG. 3. Then, the hollow shaft 19 is made rotatable so that the attempt reverse rotation of the spool 1 can be transmitted to the linking gear 16, the braking gear 21 meshed with the linking gear 16 and the hollow shaft 19 in this order, but the rotation of the hollow shaft 19 is braked with a minute braking force by the friction plate 26 depressed thereto and non-rotatably fitted on the fixed support shaft 17. The magnitude of the minute braking force produced by the second drag mechanism B can be adjusted with the second drag knob 28.

To set again the normal drag condition from the fish wait condition when, for instance, a fish is biting a bait, the handle shaft 9 is rotated, so that due to the rotation of the ratchet 13 the returning projection 13' collides on the lower end of the drive rod 29 to move the rod 29 upward, whereby the cam 23' is rotated with the aid of the abutment portion 29' and the drive projection 23'' to engage the engagement claw 24 with the ratchet 18. Accordingly, the hollow shaft 19 is set into the fixed condition again so that the first drag mechanism A can apply the braking force to the spool 1.

This embodiment is arranged so as to be returningly switched from the working of the second drag device B to the working of the first drag device A automatically in response to the rotation of the handle shaft 9. However, the switch operation can be made only by the manual manipulation of the operation member 22. Further, in this embodiment planetary gear trains are provided on the handle shaft and the linking gear 16 is meshed with the braking gear 21 in order to prevent the reverse rotation of the handle 8. However, the drive gear 10 integrally fixed on the handle shaft 9 may be directly meshed with the braking gear 21 as long as the reverse rotation of the handle 8 is allowable.

In accordance with the present invention, since a first drag mechanism for setting a normal drag condition and a second drag mechanism for a minute or fine spool braking are provided on a shaft independent from a handle shaft, and the fishing reel can be switched from the working of the second drag mechanism for the minute braking capable of coping with the fish wait condition to the working of the first drag mechanism manually or automatically in linking with the handle shaft rotation. Thus the adjustment of the minute braking force, i.e. the fishline tension, can be achieved in the fish wait state as required in accordance with an environmental fishing condition, similarly to the normal drag state.

Moreover, when switching from the second drag device to the first drag device is accomplished by handle rotation, the required switching operation can be achieved automatically, smoothly and rapidly to make it easier to perform standard fishing procedures, including the fish wait condition.

What is claimed is:

1. A fishing reel having a frame, a spool mounted on the frame, and a drag device for the spool comprising:

a fixed support shaft mounted on the frame;

a hollow shaft rotatably fitted on the fixed support shaft and selectively engaged with a reverse rotation preventive means for selectively preventing a reverse rotation of the hollow shaft with respect to the fixed support shaft;

a brake gear rotatably fitted on and frictionally coupled to the hollow shaft by a first drag mechanism for producing a first braking force against a reverse rotation of a spool in a first condition wherein the reverse rotation preventive means prevents the reverse rotation of the hollow shaft;

a torque transmission means for transmitting a rotational torque of said spool to said brake gear; and a second drag mechanism for frictionally coupling the hollow shaft to the fixed support shaft to produce a second braking force against the reverse rotation of the spool in a second condition wherein the reverse rotation preventive means permits the reverse rotation of the hollow shaft.

2. The device according to claim 1, wherein the first and second drag mechanisms are respectively equipped with first and second adjusting knobs to control the first and second braking forces.

3. The device according to claim 2, wherein the first adjusting knob is threadingly engaged with the hollow shaft, and the second adjusting knob is threadingly engaged with the fixed support shaft.

4. The device according to claim 1, further comprising:

automatic returning means for returning the reverse rotation preventive means from the second condition to the first condition upon rotation of a reel handle.

5. The device according to claim 1, wherein said torque transmission means comprises a planetary gear train, and wherein one of the first and second braking forces is transmitted to the spool through a linking gear associated with said planetary gear train.

* * * * *